US007805566B2

(12) United States Patent
Abouelwafa et al.

(10) Patent No.: US 7,805,566 B2
(45) Date of Patent: Sep. 28, 2010

(54) REPLICATION IN STORAGE SYSTEMS USING A TARGET PORT MIMICKING A HOST INITIATOR PORT

(75) Inventors: Ayman Abouelwafa, Folsom, CA (US); Robert A. Cochran, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 717 days.

(21) Appl. No.: 11/729,488

(22) Filed: Mar. 29, 2007

(65) Prior Publication Data

US 2008/0244174 A1 Oct. 2, 2008

(51) Int. Cl.
*G06F 12/00* (2006.01)

(52) U.S. Cl. .................. 711/114; 711/111; 711/162; 711/E12.001; 709/239; 703/25

(58) Field of Classification Search ................. None
See application file for complete search history.

(56) References Cited

U.S. PATENT DOCUMENTS

| 6,345,368 B1 * | 2/2002 | Bergsten ................ 714/11 |
| 7,391,731 B1 * | 6/2008 | Skelly et al. ............ 370/238 |
| 7,415,593 B2 * | 8/2008 | Mashima et al. ........ 711/203 |
| 2008/0126784 A1 * | 5/2008 | Iima et al. .................. 713/2 |

* cited by examiner

Primary Examiner—Shawn X Gu

(57) ABSTRACT

Embodiments include methods, apparatus, and systems for replication in storage systems. One embodiment includes a method that uses a target port on a storage array to function as an initiator port on a host in a storage area network (SAN). The target port discovers storage arrays in the SAN and mimics an initiator port to transmit input/output (I/O) requests.

20 Claims, 3 Drawing Sheets ns as a host, an initiator feature is enabled. In this instance, the primary array commences a process in which it functions as an initiator array or initiator port. As an initiator, the primary array discovers other arrays to potentially communicate with as a host would for data transfers during a synchronous or asynchronous mirror or data transfer operation.

REPLICATION IN STORAGE SYSTEMS USING A TARGET PORT MIMICKING A HOST INITIATOR PORT

BACKGROUND

Enterprises commonly maintain multiple copies of important data and expend large amounts of time and money to protect this data against losses due to disasters or catastrophes. One class of techniques for maintaining redundant data copies is known as mirroring, in which copies of data are located at both a primary storage location and a secondary or remote storage location. If the data is mirrored to an offsite location, then the data is protected against disasters and catastrophes, such as fire, power outages, theft, earthquakes, tornadoes, hurricanes, floods, etc. Many data processing systems employ multiple levels of redundancy to protect data and locate these systems at separate geographical locations.

Data processing systems often utilize disk mirroring to replicate data onto separate logical disk volumes using one of various techniques, such as synchronous mirroring or asynchronous mirroring. Synchronous mirroring is generally used when response distances between copy storage are short and data cannot be lost. By contrast, asynchronous mirroring is used when the smallest possible performance impact is to be imposed on the primary site and mirrored data is to travel long distances. Asynchronous mirroring is often used for very large geographical scale operations.

Due to proprietary protocol requirements, storage arrays coupled to replicate data are homogenous. Companies spend thousands or even millions of dollars to purchase matching pairs of arrays that perform disaster recovery failover and failback.

BRIEF SUMMARY OF THE INVENTION

In one example embodiment, a storage array mimics a host in order to discover storage devices for the host. A target port on the storage array functions as an initiator port on the host in a storage area network (SAN). The target port discovers storage arrays in the SAN and mimics the initiator port to transmit input/output (I/O) requests.

DETAILED DESCRIPTION

Embodiments are directed to apparatus, systems, and methods for replicating data in a storage system or storage area network (SAN). In one embodiment, a storage device mimics or replicates a host in order to discover and communicate with heterogeneous storage arrays in a SAN. For example, a primary storage array logs into a fabric and acts not only as a target to its respective hosts, but also acts at the same time as an initiator to transfer data for mirroring or replication to target arrays also logged into the fabric. For instance, when a user designated primary storage array functions as a host, an initiator feature is enabled. In this instance, the primary array commences a process in which it functions as an initiator array or initiator port. As an initiator, the primary array discovers other arrays to potentially communicate with as a host would for data transfers during a synchronous or asynchronous mirror or data transfer operation.

During the discovery process, the primary storage device (acting as a host) gathers a list of potential other storage devices that can be replication candidates or targets for receiving data. This list is stored in a table in the array cache of the primary storage device and then provided or output to a user. The user selects the discovered storage devices projected for partnership with the primary storage device. If one or more partnerships are selected, then the primary storage device (i.e., the initiator) negotiates various communication parameters with the selected target storage devices. Such communication parameters can include parameters for best performance and reliability for data replication between the primary storage device (the initiator) and one or more target storage devices.

A user then assigns a replication LUN (logical unit number) or a group of LLNs at each side to be designated as either primary or replication target LUNs. In one exemplary embodiment, the primary LUNs are the primary storage device LUNs that allow a data "push" model to keep the target LUNs up-to-date or current as the source LUN changes. If the target LUNs reside on the primary storage device, a data "pull" model would only allow for static, one-time copies since the primary storage device would have no way to know when data has changed on the source LUNs. After the designation, the primary storage device automatically manages the data replication by functioning as a host.

Figure 1:
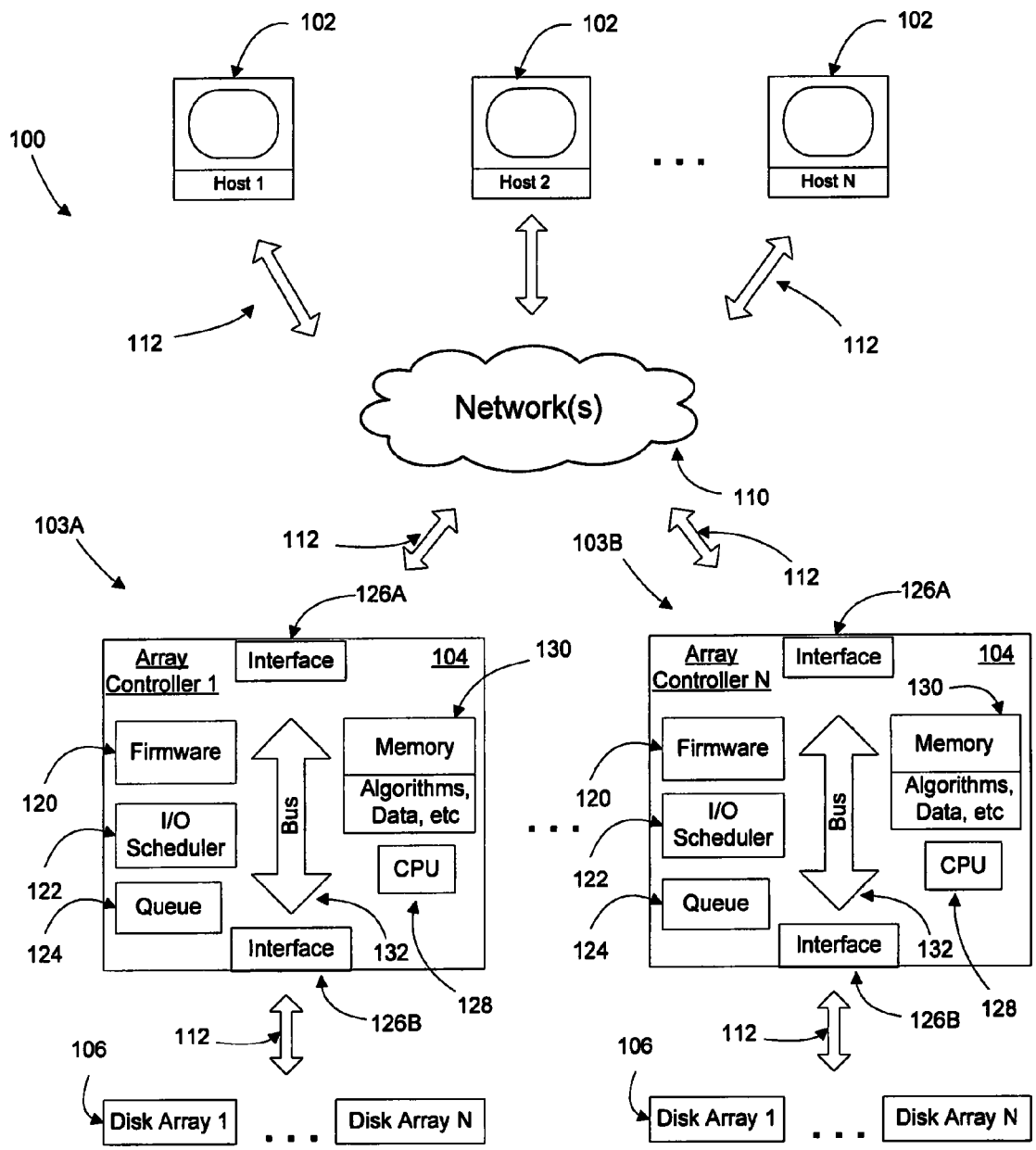
FIG. 1 is a block diagram of a storage system in accordance with an exemplary embodiment of the present invention.

FIG. 1 is a block diagram of an exemplary distributed file or storage system 100 in accordance with an exemplary embodiment of the invention. By way of example, the system is a storage area network (SAN) that includes a plurality of host computers 102 and one or more storage devices 103A, 103B that include one or more storage controllers 104 (shown by way of example as an array controller), and a plurality of storage devices 106 (shown by way of example as disk array 1 to disk array N).

The host computers 102 (shown as host 1 to host N) are coupled to the array controller 104 through one or more fabrics or networks 110. For instance, the hosts communicate with the array controller using a small computer system interface (SCSI) or other interface/commands over a fiber channel (FC). Further, by way of example, network 110 includes one or more of the internet, local area network (LAN), wide area network (WAN), etc. Communications links 112 are shown in the figure to represent communication paths or couplings between the hosts, controller, and storage devices.

In one exemplary embodiment, the array controller 104 and disk arrays 106 are network attached devices providing random access memory (RAM) and/or disk space (for storage and as virtual RAM) and/or some other form of storage such as magnetic memory (example, tapes), micromechanical systems (MEMS), or optical disks, to name a few examples. Typically, the array controller and disk arrays include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the array controller 104 and disk arrays 106 are memory nodes that include one or more servers.

The storage controller 104 manages various data storage and retrieval operations. Storage controller 104 receives I/O requests or commands from the host computers 102, such as data read requests, data write requests, maintenance requests, etc. Storage controller 104 handles the storage and retrieval of data on the multiple disk arrays 106. In one exemplary embodiment, storage controller 104 is a separate device or may be part of a computer system, such as a server. Additionally, the storage controller 104 may be located with, proximate, or a great geographical distance from the disk arrays 106 or from each other.

The array controller 104 includes numerous electronic devices, circuit boards, electronic components, etc. By way of example, the array controller 104 includes firmware 120, an input/output (I/O) scheduler 122, a queue 124, one or more interfaces 126, one or more processors 128 (shown by way of example as a CPU, central processing unit), and memory 130 (including cache). CPU 128 performs operations and tasks necessary to manage the various data storage and data retrieval requests received from host computers 102. For instance, processor 128 is coupled to a host interface 126A that provides a bidirectional data communication interface to one or more host computers 102. Processor 128 is also coupled to an array interface 126B that provides a bidirectional data communication interface to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including software to implement or assist in implementing embodiments in accordance with the present invention), and other data associated with the storage device. The processor 128 communicates with memory 130, interfaces 126, and the other components via one or more buses 132.

In at least one embodiment, the storage devices are fault tolerant by using existing replication, disk logging, and disk imaging systems and other methods including, but not limited to, one or more levels of redundant array of inexpensive disks (RAID). Replication provides high availability when one or more of the disk arrays crash or otherwise fail. Further, in one exemplary embodiment, the storage devices provide memory in the form of a disk or array of disks where data items to be addressed are accessed as individual blocks stored in disks (example, 512, 1024, 4096, etc. . . . bytes each) or stripe fragments (4K, 16K, 32K, etc. . . . each).

In one exemplary embodiment, the I/O scheduler manages and schedules processor time for performing I/O requests. The scheduler balances loads and prevents any one process from monopolizing resources while other processes starve for such resources. The scheduler further performs such functions as deciding which jobs (example, I/O requests) are to be admitted to a ready queue, deciding a number or amount of processes to concurrently execute, determining how performance (example, bandwidth or I/Os per second) is divided among plural initiators (example, applications) so each initiator receives optimal performance.

In one embodiment, the interfaces include one or more ports, such as FC target ports or host basing ports. For example, disk arrays have FC target ports for receiving I/O requests and data. The FC target port is functionally altered to become an initiator port that transmits I/O requests and data to other disk arrays (targets). The transmitting disk array appears as a host computer to the target disk arrays. In one exemplary embodiment, the FC target port functions as both a target port for receiving I/O requests (reads and writes) and data and functions as an initiator port that sends I/O requests and data to target disk arrays.

In one embodiment the storage devices 103A, 103B are disk arrays. The disk array 103A is a storage device that functions as a host to disk array 103B. In other words, the array 103A appears to be a host to the array 103B. I/Os and data are sent from array 103A to 103B in a same manner as they would be sent from a host 102 to array 103B.

In one embodiment, storage devices 103A, 103B are physically located in a same data center. In another embodiment, the storage devices are located a great geographical distance apart in separate data centers. Further, although only two storage devices are shown, a SAN can include hundreds or thousands of such storage devices.

In one exemplary embodiment, one or more of the storage devices discovers other storage devices logged into the network. For instance, storage device 103A performs both disk array discover and data replication as if it were a host. In some embodiments, it is not efficient for the host to perform array discovery and replication. Storage device 103A assists the host in performing these tasks and improves efficiency since processing resources of the host are not devoted to array discovery and data replication.

In one embodiment, hosts communicate with the storage devices using standard or known communication. A storage device mimics a host to communicate with other storage devices. Once a storage device (functioning as a host) discovers other storage devices on the SAN, the discovered storage devices are presented (example, outputted to a display) to a user. The user then decides which of the storage devices thereafter will function as hosts and which storage devices will function as targets. The user also determines which paths will be used to for transferring data between an initiator storage device and one or more target storage devices. In one exemplary embodiment, the primary LUNs are the primary storage device LUNs that allow a data "push" model to keep the target LUNs up-to-date or current as the source LUN changes. If the target LUNs reside on the primary storage device, a data "pull" model would only allow for static, one-time copies since the primary storage device would have no way to know when data has changed on the source LUNs.

In one embodiment, various factors are used to avoid out-of-order or latent replication (example, stacked I/Os in buffer) . For example, speed, performance, FC, and bandwidth are used to determine which storage devices will function as hosts and which paths to choice for transmitting I/O requests and data.

Figure 2:
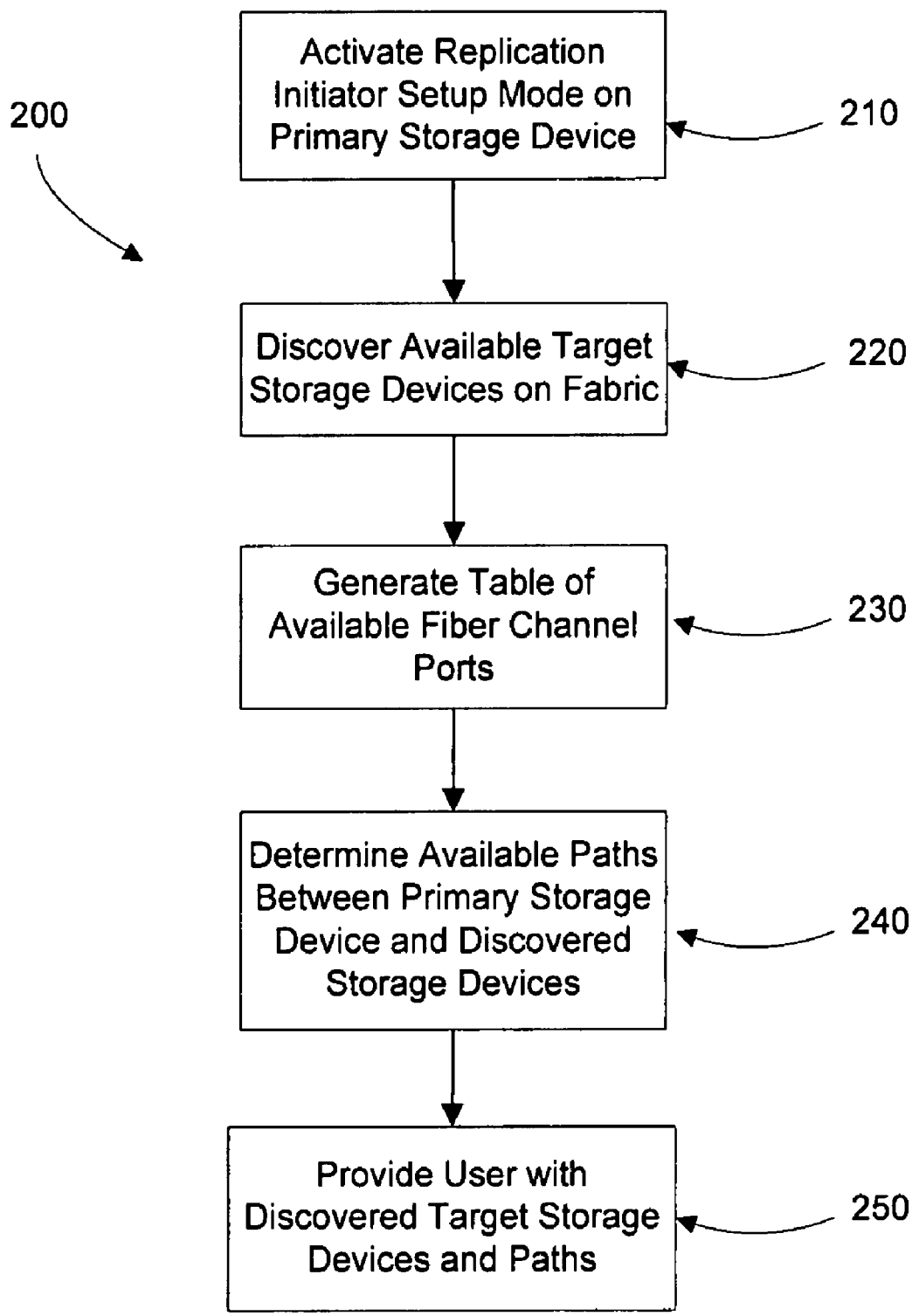
FIG. 2 is a flow diagram for discovering target storage devices in a storage area network in accordance with an exemplary embodiment of the present invention.

Exemplary embodiments provide a flexible and low-cost disaster recovery process for SANs that utilize dissimilar storage arrays (example, heterogeneous storage arrays that are manufactured by different companies). FIG. 2 is a flow diagram 200 for discovering target storage devices in a storage area network in accordance with an exemplary embodiment of the present invention.

According to block 210, replication initiator setup mode is activated on a primary storage device (example, on device 103A in FIG. 1). In one embodiment, the replication initiator setup mode is activated or toggled on or off. For instance, a storage device receives a command from a management host (example, a GUI in use) or other computer (example, an API in use) to function as a host on the network.

When the primary storage device is activated to the replication initiator setup mode, a process commences on the firmware of the storage device to target each array discoverable from each fiber channel (FC) port. The storage device thus functionally behaves as if it is a custom initiator fiber port similar to a host bus adaptor.

According to block 220, the primary storage device discovers target storage devices that are logged on to the fabric. Specifically, the FC port discovers all available arrays on the fabric. This process of discovering available arrays on the fabric is repeated for each FC port on the storage device.

According to block 230, a table is generated of the available fiber channel ports or storage devices that were discovered. The results of the discovery process are placed in a table in the array cache or shared memory of the storage device. In one embodiment, this process of discovering and saving potential target arrays is repeated for every FC port on the array. In another embodiment, the process is repeated for a specified set of ports designated by the user. As a result, one or more tables are generated for every non-restricted SAN-facing FC port logged into the fabric.

According to block 240, a determination is made of the available paths between the primary storage device and the discovered storage devices. In one embodiment, the resulting tables from block 230 are merged into one master table. The master table provides a list of all potential pathways from the primary storage device to all discovered target storage devices. At this juncture, the primary storage device has discovered or learned how to reach its target arrays through one or more paths.

According to block 250, the user is provided with the discovered target storage devices and the associated paths between the primary storage device (the initiator) and the discovered storage devices (the targets). In one embodiment, the primary storage device communicates the master table to the user through a GUI (graphical user interface) or API (application program interface). The tables provide the user with information to select one or more target storage devices (example, target arrays) and one or more paths to the selected target storage devices.

Once the user makes a selection, the primary storage device knows which storage devices to partner with and how many paths are available to communicate with the target storage device. Communication paths between the storage devices can be one to one, one to many, many to one, and/or many to many. By way of example, paths include one or more of FC (1 B, 2 GB, 4 GB, etc.), iSCSI (internet small computer system interface), FC/IP (fiber channel internet protocol), etc.

Figure 3:
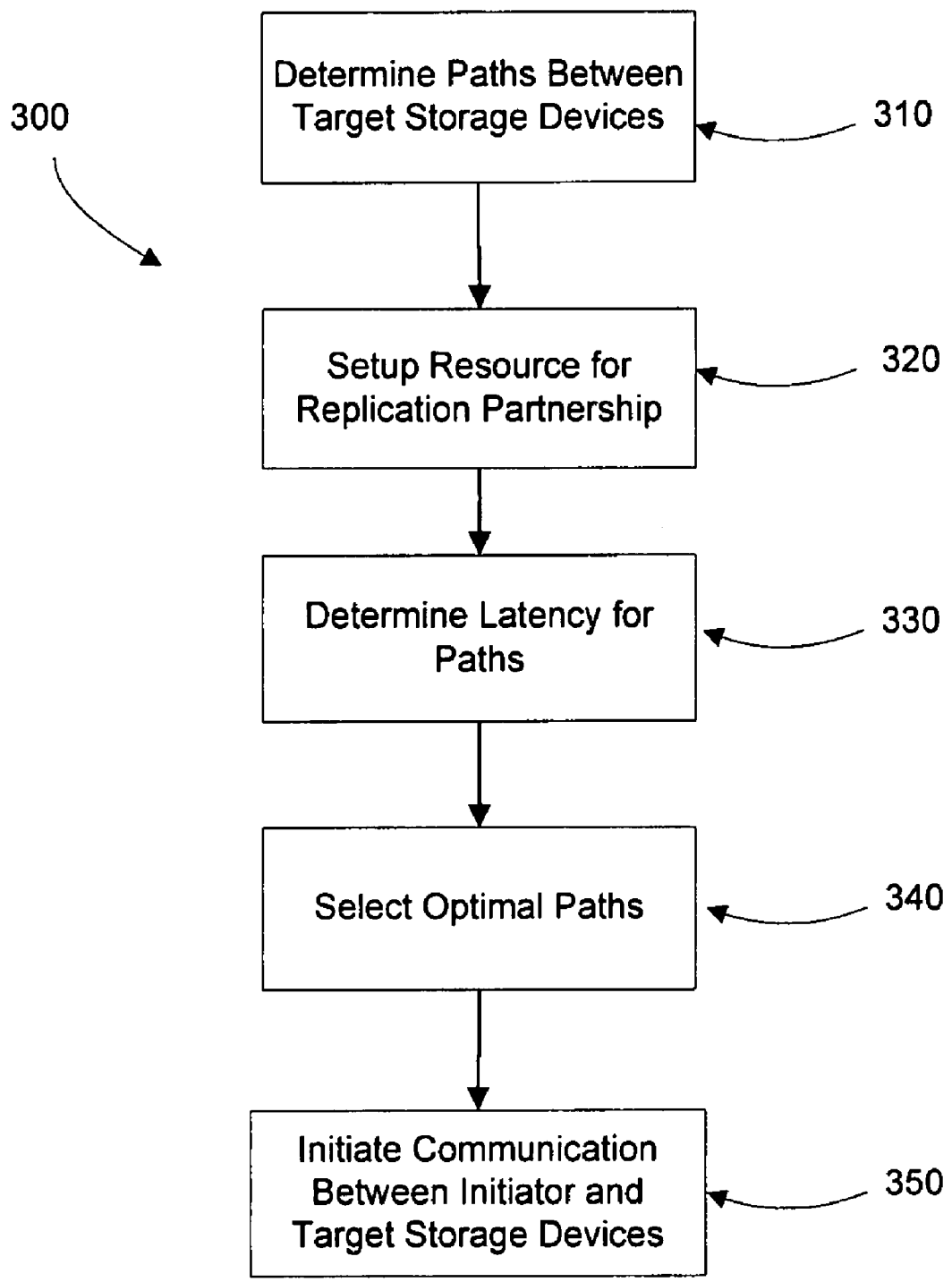
FIG. 3 is a flow diagram for determining an optimal path between target storage devices in a storage area network in accordance with an exemplary embodiment of the present invention.

FIG. 3 is a flow diagram 300 for determining an optimal path between initiator and target storage devices in a storage area network in accordance with an exemplary embodiment of the present invention.

According to block 310, a determination or selection is made between paths of the various initiator and target storage devices. In one embodiment, the user selects the paths based on information provided from the discovery process of FIG. 2. In another embodiment, the paths are automatically selected using, for example, a computer based path selection algorithm. The selection can be based on one or more of speed, bandwidth, distance, time, and/or other costs.

According to block 320, resources are established for the replication partnership. The user establishes resources to be part of the replication partnership between the selected initiator and target storage devices. Establishment of the resources includes determining which LUNs can partner as initiators and targets.

According block 330, a determination is made of the latency for paths between the selected initiators and target storage devices. In one embodiment, a pre-defined set of read and write I/Os (input/outputs) are sent along each path to determine the latency for each path.

According to block 340, one or more optimal or efficient paths are selected. By way of example, the latency for each path is assigned a value (such as a cost). Paths with higher latencies have higher costs and result in a lower number of I/Os being sent along the path. By contrast, paths with lower latencies have lower costs and result in a higher number of I/Os being sent along the path.

According to block 350, communication initiates between the initiator and targets storage devices. The storage devices communicate with a predefined host mode. By way of example, storage arrays communicate using a standardized or known Windows host mode.

As the host writes data to the LUN or the set of LUNs that are part of the resource replication partnership, the I/O writes are cloned in the controller cache. The I/Os are then directly sent to the target controller through a path known to the target array considering load balancing of the FC exchanges (exchanges are used instead of frames to avoid out-of-order frame delivery on the target side if some links are slower than others) and load balancing from the source array based on the associated and pre-calculated cost.

If the microcode of the source storage device (initiator) discovers that the one or more target storage devices cannot keep up with write I/Os sent, then a spool LUN is used for multiple replication resource group.

As used herein, the term "storage device" means any data storage device capable of storing data including, but not limited to, one or more of a disk array, a disk drive, a tape drive, optical drive, a SCSI device, or a fiber channel device. As used herein, a "disk array" or "array" is a storage system that includes plural disk drive, a cache, and controller. Arrays include, but are not limited to, networked attached storage (NAS) arrays, modular SAN arrays, monolithic SAN arrays, utility SAN arrays, and storage virtualization. As used herein, a "target port" is an interface on an electronic device that receives I/O requests and/or data. As used herein, an "initiator port" is an interface on an electronic device that transmits I/O requests and/or data.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    using a target port on a storage array to function as and mimic an initiator port on a host in a storage area network (SAN);
    discovering storage arrays in the SAN with the target port mimicking the initiator port on the host such that the storage array appears as the host to the discovered storage arrays; and
    mimicking the initiator port with the target port to transmit input/output (I/O) requests from the target port to the discovered storage arrays.

2. The method of claim 1 further comprising, commencing a process in firmware in the storage array to enable the target port to function as a host bus adaptor on the host.

3. The method of claim 1 further comprising, storing a list of the discovered storage arrays in a table that is located in a cache in the storage array.

4. The method of claim 1 further comprising:
    using a second target port on the storage array to function as an initiator port;
    discovering with the second target port additional discovered storage arrays in the SAN;
    displaying the additional discovered storage arrays to a user.

5. The method of claim 1 further comprising:
    discovering various fiber channel paths between the target port and the discovered storage arrays;
    determining which of the various fiber channel paths has a better performance for data transmission.

6. The method of claim 1 further comprising, receiving, at the storage array and from a management host, a command that instructs the storage array to function as and mimic the host in the SAN.

7. The method of claim 1 further comprising:
    determining, by the storage array, different paths between the target port and the discovered storage arrays;
    sending read and write I/Os along the paths to determine a latency for each path.

8. A computer readable medium having instructions for causing a computer to execute a method, comprising:
    receiving, at a storage device, a command to mimic a host to other storage devices in a storage area network (SAN);
    in response to the command, using a target port on the storage device to function as and mimic an initiator port on the host in the SAN;
    using the target port on the storage device functioning as and mimicking the host to discover the other storage devices logged into the SAN; and
    presenting a user with the other storage devices and paths from the target port to the other storage devices.

9. The computer readable medium of claim 8 further comprising, mimicking, by the storage device, the initiator port with the target port to transmit input/output (I/O) requests from the target port to the other storage arrays.

10. The computer readable medium of claim 8, wherein the storage device discovers the other storage devices as the host would for data transfers during a synchronous or asynchronous mirror operation between the host and the other storage devices.

11. The computer readable medium of claim 8 further comprising:
    cloning I/O writes in a controller cache of the storage device;
    sending the I/O writes to target controllers directly through paths discovered by the storage device.

12. The computer readable medium of claim 8 further comprising:
    devoting processing resources of the storage device to discovering the other storage devices for the host in order to improve efficiency of the host since processing resources of the host are not devoted to discovering the other storage devices.

13. The computer readable medium of claim 8 further comprising:
    sending I/O requests along different paths between the target port and the other storage devices to determine a difference in latency in data transmission between the different paths.

14. The computer readable medium of claim 8 further comprising, using the target port to transmit data to a remote storage array for replicating data.

15. The computer readable medium of claim 8 further comprising,
    designating a first portion of the other storage devices to be target disk arrays for storing replication data;
    designating a second portion of the other storage devices to be initiator disk arrays for sending replication data.

16. A storage device, comprising:
    a target port that receives input/output (I/O) requests from a host; and
    a controller that executes an algorithm to instruct the target port to (1) function as an initiator port that sends I/O requests to remote storage devices while mimicking as an initiator port of the host to the remote storage devices, (2) discover other storage devices such that the storage device appears as the host to the discovered other storage devices, and (3), wherein the storage device mimics the host to appear as the host to the remote storage devices.

17. The storage device of claim 16, wherein the target port functionally behaves as a custom initiator port similar to a host bus adapter.

18. The storage device of claim 16, wherein the target port functions as both a target fiber channel port and an initiator fiber channel port.

19. The storage device of claim 16, further comprising firmware that commences a process to enable the target port to function as the initiator port of the host.

20. The storage device of claim 16, further comprising cache for storing tables having names of remote storage devices in communication with the target port.

* * * * *

UNITED STATES PATENT AND TRADEMARK OFFICE
CERTIFICATE OF CORRECTION

| | |
|---|---|
| PATENT NO. | : 7,805,566 B2 |
| APPLICATION NO. | : 11/729488 |
| DATED | : September 28, 2010 |
| INVENTOR(S) | : Ayman Abouelwafa et al. |

It is certified that error appears in the above-identified patent and that said Letters Patent is hereby corrected as shown below:

In column 8, line 52, in Claim 16, delete "(3)," and insert -- (3) --, therefor.

Signed and Sealed this
Twelfth Day of April, 2011

David J. Kappos
*Director of the United States Patent and Trademark Office*